(12) United States Patent
Korisch

(10) Patent No.: US 6,415,268 B1
(45) Date of Patent: Jul. 2, 2002

(54) METHOD OF RECOVERING THE REAL VALUE OF A STOCK FROM THE STOCK PRICING DATA

(76) Inventor: Semmen I. Korisch, Ul. Moskovskaya 216, kv 48, Ekaterinburg 620146 (RU)

( * ) Notice: Subject to any disclaimer, the term of this patent is extended or adjusted under 35 U.S.C. 154(b) by 0 days.

(21) Appl. No.: 09/414,166

(22) Filed: Oct. 8, 1999

Related U.S. Application Data

(63) Continuation-in-part of application No. 09/120,022, filed on Jul. 20, 1998, now abandoned.

(51) Int. Cl.⁷ ............................................... G06F 17/60
(52) U.S. Cl. .......................................................... 705/36
(58) Field of Search ...................................... 705/36, 37

(56) References Cited

U.S. PATENT DOCUMENTS 5,761,442 A * 6/1998 Barr et al. ................... 395/236

FOREIGN PATENT DOCUMENTS

JP   408197872 A  *  8/1996

OTHER PUBLICATIONS

Omes et al., "A Neural Network that Explains as Well as Predicts Financial Market Behavior," Computational Intelligence for Financial Engineering (CIFEr), Proceedings of IEEE/IAFE, pp. 43–49, Mar. 24–25, 1997.*
Trippi et al. (eds.), Neural Networks in Finance and Investing, McGraw–Hill, Chapter 24, 1996.*
Hong et al., "Conservative Thirty Calender Day Stock Prediction Using a Probabilistic Neural Network," Applied Computational Intelligence Laboratory, IEEE, 1995.*
Wuthrich et al., "Daily Stock Market Forecast From Textual Web Data," IEEE International Conference on Systems, Man, and Cybernetics, vol. 3, pp. 2720–2725, 1998.*
Takahashi et al., "Multiple Line–Segments Regression for Stock Prices and Long–Range Forecasting System by Neural Network," Proceedings of the 37$^{th}$ SICE Annual Conference, pp. 1127–1132, 1998.*

* cited by examiner

Primary Examiner—Tariq R. Hafiz
Assistant Examiner—Susanna Meinecke-Diaz

(57) ABSTRACT

A method of recovering the real value of a stock from the stock pricing data collected in a stock market and related ways of selecting stocks in the market are described. The method involves the steps of separating stock pricing data into two components. The first one represents the real value of a stock because it is firmly linked with financial fundamentals of an underlying enterprise. The second one is a random function of time, herein referred to as the noise wave of a stock. The real stock value is represented by a function of time, herein referred to as the value function of a stock. The value function of a stock represents the trend of appreciation of a stock in a stock market. The growth rate of the value function of a stock is introduced as a measure of appreciation of an investment in a stock. A measure of risk of an investment in a stock is introduced as a function of ordinates of the noise wave of the stock. An integral indicator of investment value of a stock is introduced and proven effective for selecting individual stocks or components for a portfolio of stocks.

7 Claims, 10 Drawing Sheets

US 6,415,268 B1

METHOD OF RECOVERING THE REAL VALUE OF A STOCK FROM THE STOCK PRICING DATA

This is a continuation-in-part of application Ser. No. 09/120,022, filed Jul. 20, 1998, now abandoned.

FIELD OF THE INVENTION

The present invention relates generally to the methods of recovering or extracting useful information from data containing noise or distorted by noise. More particularly, the present invention relates to recovering the real value of a stock from the stock pricing data by removing the noise associated with a stock in a stock market.

BACKGROUND OF THE INVENTION

The prior art in the field of the invention does not appear to disclose any method that is similar to the method of the present invention for recovering the real value of a stock from the stock pricing data.

The closest prior art appears to reside in the three following groups of approaches to and methods of stock valuation.

The first group of the stock valuation methods is usually associated with the value investment pioneered by Benjamin Graham. Its basic concept holds that the ability of a corporation to produce earnings determines the value that a stock market attributes to the stock of the corporation. The following is an interpretation of this concept by Nelson D. Schwartz (FORTUNE, Nov. 24, 1997). Aimed at general public, in order to make his point more vivid and convincing, he describes how Graham created a Mr. Market who comes and offers to buy a candy store. "Some days he's feeling up and offers wildly high prices; other days he offers wildly low prices. But regardless of Mr. Market's mood, the store's current business and its future prospects are unaffected. If you were the owner of the store, you'd value it on how much cash it was throwing off, and how much you expected it to throw off in the future. You'd sell to Mr. Market only if you believed that, after taking the proceeds and putting them into an alternative investment, you'd end up with more money—not just today, but all the way down the line. The trick, of course, is predicting the cash flow of your candy store out into the future, as well as the appropriate interest rate to use in discounting it".

Given the assumption that the financial fundamentals of a corporation is the only determinant of its stock pricing in the market, the Graham's approach to stock valuation can be defined as deterministic valuation.

Accuracy of such valuation is low because it does not properly account for the random components in both stock pricing data and financial fundamentals of a corporation.

For example, consider how Jim Jubak, a well known analyst and writer, addresses this issue in his article "A Buying Panic" in the April's, 1997, WORTH magazine: "Fundamentals don't count for much. It does not matter if a stock is expensive (like Merck) or outrageously expensive (like Coca-Cola), as long as the price is rising. Professional investors are torn between a desperate fear of underperforming the indexes again and knowledge that the market could trash any stock tomorrow on the smallest signs that its upward price momentum might be slowing down—even if the fundamentals are still sound".

Another example is by Chuck Clough, Merrill Lynch's top strategist: "Stock market valuation is imperfect science. I've been around a long time, and I've used every conceivable model known to man. There are valuation models that say the market's incredibly overvalued, and there are models that say it's undervalued", cited in the above-mentioned article by Nelson D. Schwartz.

The second group of the methods of stock valuation and investment analysis can be classified as a pure probabilistic approach. Harry Markowitz initiated it in 1952. A Yale Professor William N. Goetzmann in the following way represent this concept in his Web course of investment theory: "Finance professor Harry Markowitz began a revolution by suggesting that the value of a security to an investor might best be evaluated by its mean, its standard deviation, and its correlation to other securities in the portfolio. This audacious suggestion amounted to ignoring a lot of information about the firm—its earnings, its dividend policy, its capital structure, its market, its competitors—and calculating a few simple statistics.

The Markowitz model was a brilliant innovation in the science of portfolio selection. With almost a disarming sleight-of-hand, Markowitz showed us that all the information needed to choose the best portfolio for any given level of risk is contained in three simple statistics: mean, standard deviation and correlation. It suddenly appeared that you didn't even need any fundamental information about the firm."

However, the mathematical abstracts such as the mean and the standard deviation, unable to substitute or represent the real influence of corporate financial fundamentals on stock value and return on investment. Without such a link to the real world, this approach results in statistical processing of data containing both a regular (not random) component and a pure random component. Without first dividing these parts, it is impossible to distinguish between a change caused by a trend of appreciation of the value of a stock and a random change of its price.

More generally, such a true expanding system as a stock market can not be adequately represented or described by such simple statistics as the mean (the first moment of a probability distribution) and/or the standard deviation (the second moment of a probability distribution). By definition, an expanding system is the system whose main parameters and characteristics are evolving over time. Such a system has no fixed set of probabilities or a fixed probabilities distribution, the main requirements of applying to a system those standard probabilistic procedures. Such statistics as the mean value of a variable or its standard deviation in an expanding system are becoming outdated the moment they are calculated and thus meaningless without specifying how they are influenced by the expansion of the system. When these statistics nonetheless are applied to an expanding system, this brings about a distorted picture of the system, which a prominent English statesman, Benjamin Disraeli (1804–81) summarized in the following way: "There are three kinds of lies: lies, damned lies and statistics".

A combination of deterministic and probabilistic approaches to stock valuation (often referred to as determining the potential of appreciation of a stock) is widely represented in the prior art. Both the pricing data of a stock and fundamental data of an underlying company are processed together for selecting stocks for a portfolio of stocks aimed at surpassing a select market index. There are more and more complex computing means involved in probabilistic processing of huge arrays of these kinds of data.

U.S. Pat. No. 5,761,442 to Dean S. Barr et al. discloses a data processing system involving an artificial neural network "for estimating the appreciation potential of each security in a capital market using both fundamental and technical information about the security".

However, though being complex and sophisticated in terms of scope of processed data, fundamentally, such data processing systems do not depart from the above-mentioned pure probabilistic approach, as both the market pricing data and fundamental data are processed using similar statistical procedures and involving traditional statistics and statistical indicators such as the standard deviation, BETA, ALPHA and others. Though declared in the Summary of the above-mentioned invention that the use of neural networks "provides the capability to capture non-linear functional relationship among input variables", there is no proof in the invention disclosure that this kind of result is achieved, as there is no expressions, formulas or graphs in the disclosure demonstrating an actually "captured" functional relationship between the system's variables, but a standard formula for calculating the average of the difference between two variables.

More generally, the main flaw of the systems of probabilistic processing of these kinds of arrays of data is that the processing itself is just changing the form of data representation. There is still no proof whatsoever that a new form of representing data provides new knowledge about a system. Though being able to reveal some short term recurring patterns of system's behavior, the probabilistic processing of data has never proved to reveal long lasting relationships between system's variables, which is a basic indication of a new knowledge about a system. In other words, the so-called black-box approach to getting new knowledge via using some statistical processing procedures typically results in a replacement of one set of numbers by another one. As a rule, the same kind of statistics, as the averaging in the above-considered patent are used to prove that the last set of numbers is better than the first one. That is why this kind of statistical data processing sometimes looks like an endless vicious circle of comparing statistical indicators, not a way to new knowledge about a system.

An alternative to the methods of probabilistic data processing and a way to new knowledge about a stock market provide the theory of measurement in expanding systems and its application to stock markets, the theory of pragmatic investment, both are developed by author of this invention. Pragmatic investment is a new technique of investment decision-making based on the knowledge about a real stock value obtained in a stock market by direct measurement. From metrological point of view, a stock market acts as a gigantic transducer transforming its inputs in the form of bid-ask prices into the output containing the real value of a stock. The main mathematical instrument of the theory of measurement in expanding systems is differential-intermittent calculus (DI-calculus), which is a kind of differential calculus for functions that are not differentiable, i.e. not having a derivative, in the strict classical meaning of this notion. DI-calculus enables an analyst to distinguish between changes in an expanding system caused by its expansion and random changes (fluctuations). For a stock market, the first is interpreted as the trend of appreciation of an investment in a stock, while the last represents the risk of an investment in a stock. The DI-calculus is a private property of author of this invention. The elements of DI-calculus relevant to the subject matter of this invention are briefly explained in the section "Detailed Description of the Invention".

The third group of stock valuation approaches is represented by the method of moving average applied to stock pricing data (Wall Street Analyst. User's Manual, Omega Research Inc. Miami, Fla., 1995, p. 250): "The Moving Average indicator is a simple average of the prices of the selected range days. It is probably the most well known, and widely used, technical indicator in existence. The indicator plots the moving average for the price and length chosen."

Though that usually remains unnoticed, the method of moving average is, in fact, an attempt of getting information about a stock value by direct measurement.

Generally, measurement can be defined as a technique of detecting and quantifying a useful signal obscured or distorted by a random variable interfering the measurement process; this random variable is usually referred to as noise.

Implicitly, the method of moving average deals with the following measurement model:

$$y=s+n \qquad (1)$$

where y is an available for observation mixture of a useful signal s and noise n, the both are unknown.

Assuming that noise is a random function of time averaging out to zero, the moving average measurement result Y is represented by the following expression:

$$Y=\text{Average}(y)=\text{Average}(s+n)=\text{Average}(s) \qquad (2)$$

If the Average(s) differs from zero, this method provides a possibility to detect a useful signal s.

Unfortunately, this method distorts the important characteristics of the s-signal, as the s-signal and the Average(s) are different functions of time.

To prove this shortcoming, let's suppose that an s-signal is a simplest linear function of time:

$$s=at$$

The growth rate of this function is its derivative a, meaning that for every unit of an increase of the argument t, the s-signal is increasing by a units.

In this case, the moving average method provides the following measurement result:

$$Y=\text{Average}(y)=\text{Average}(at+n)=\text{Average }(at)=0.5at$$

The growth rate of the measurement result is 0.5a, that is, just half of the growth rate of the original s-signal.

Even worse are the distortions of the s-signal when it grows faster than does a linear function. For example, if $s=t^2$, the growth rate of this function is 2t, its acceleration, that is the second derivative, equals 2. The moving average measurement result will show a function having a 0.67t growth rate and a close to zero acceleration.

To reduce or eliminate these distortions of the method of moving average, the simple averaging procedure should be improved in a way that would account for expected features of a useful signal associated with a source of its origin. In the case of measurement of the real stock value that means that the financial fundamentals of an underlying company should be reflected in a measurement result.

Thus, by definition, the real stock value is the value of a stock obtained by direct measurement from data collected in the stock market under the condition that the measurement result reflects financial fundamentals of an underlying company.

Though the above-mentioned definition of direct measurement is applicable to such a social system as a stock market in almost the same way as it does to physical objects and systems, there are some important differences between these systems, which should be embraced by key notions and definitions. For a stock market, the notion of measurement is modified to the notion of recovering the real stock value for the following reason.

One of the definitions of the word "recover" provided by the American Heritage Dictionary of English Language (AHDEL), Third Edition, reads: "To procure (usable substance, such as metal) from unusable substance, such as ore or waste". In our case, the "usable substance" is the real value of a stock "procured" (got by special efforts, obtained or acquired—AHDEL) from the "raw material" of pricing data of the stock collected in a stock market.

The important difference between "measurement" and "recovering" is that after getting a useful signal as a measurement result it is usually not important what were the noise characteristics of a physical system where the measurement had been conducted. Contrary to that, while recovering the real value of a stock it is crucially important to get noise specifics associated with a stock as they influence investment results associated with this stock. By recovering the real stock value is actually meant separating the pricing data of a stock into two undistorted component, the real value of the stock and the noise associated with this stock, and afterward to separately analyze their characteristics.

The previously described methods of and approaches to stock valuation can provide for some assessment or estimate of the real value of a stock. However, none of them provides a method for recovering, with specified accuracy the real value of a stock from the stock pricing data collected in the real stock market.

A function of time representing the real value of a stock in a predetermined period of time herein referred to as the value function of a stock. In the terms of DI-calculus, the value function of a stock is a definite integral representing a solution of a specific differential equation. Unlike classical integral calculus where a definite integral evaluates to a number, a definite integral in DI-calculus evaluates to a function.

A random function of time representing noise associated with a stock over a predetermined period of time herein referred to as the noise wave of a stock. The true noise wave, or simply the noise wave of a stock, by definition, has the zero-averaging feature, meaning that the average from all the ordinates of the noise wave is close to zero with specified accuracy in a predetermined period of time. Otherwise, the noise wave is called a biased noise wave.

As a matter of fact, the noise wave of a stock represents all the random short term fluctuations of a stock price that are not associated with financial fundamentals of an underlying company, such that are typically caused by upgrade-downgrade manipulations, concerted efforts of shorts players, put option players, announcements of a quarter earnings meeting or not meeting analysts expectations, and many other factors that are unavoidable in a real stock market.

SUMMARY OF THE INVENTION

It is a principal object of this invention to provide a method of recovering the real value of a stock from the stock pricing data collected in a stock market.

It is a further object of this invention to provide a method for separating the noise wave of a stock from the stock pricing data collected in a stock market.

It is still a further object of this invention to provide a measure of appreciation of an investment in a stock, to provide a measure of risk of an investment in a stock, and to provide an integral indicator of investment value of a stock, for selecting individual stocks or components of a portfolio of stocks.

The method of recovering the real value of a stock from the stock pricing data collected in a stock market includes the following steps:

representing stock pricing data as a function of time, herein referred to as the pricing function of a stock, over a predetermined period of time;

approximating said pricing function of a stock by a continuous function of time of a non-negative derivative feature, herein referred to as the value function of a stock, such that investment performance of said value function of a stock differs from that of said pricing function of the stock by less than a small predetermined limit of investment performance;

computing the ordinates of a random function of time herein referred to as the noise wave of a stock, by subtracting the ordinates of said value function of a stock from the related ordinates of said pricing function of this stock and dividing the differences by the related ordinates of said value function of this stock;

interpreting said value function of a stock as a trend of appreciation of an investment in the stock;

computing the growth rate of said value function of a stock and taking it as a quantitative measure of appreciation of an investment in the stock;

computing an indicator of noise intensity associated with a stock as a function of ordinates of said noise wave of the stock and taking said indicator of noise intensity as a measure of risk of an investment in the stock;

computing an integral indicator of investment value of a stock as a function of said measure of appreciation of an investment in the stock and said measure of risk of an investment in the stock;

selecting an individual stock or a component for a portfolio of stocks based on said integral indicator of investment value of a stock such that the investment reward of the stock is superior to that of another stock, or a portfolio of stocks, or a select market index.

The value function of a stock recovered from the stock pricing data in accordance with present invention proves to be firmly linked to financial fundamentals of a related corporation, while the noise represents the randomness of the trial-and-error process of valuing stocks in a stock market. The both pieces combined in the form of the investment reward indicator provide a simple but reliable quantitative measure for comparing stock's performance, selecting individual stocks, and allocating assets in a portfolio of stocks.

The objects and the advantages of the invention will appear more fully from the following more detailed description of the invention in conjunction with the accompanying drawings.

DETAILED DESCRIPTION OF THE INVENTION

The present invention provides a method for recovering the real value of a stock from pricing data of the stock collected in the stock market. In the preferred embodiment of the present invention, by pricing data of a stock is understood the closing prices of a stock, available at the ends of trading sessions.

Figure 1:
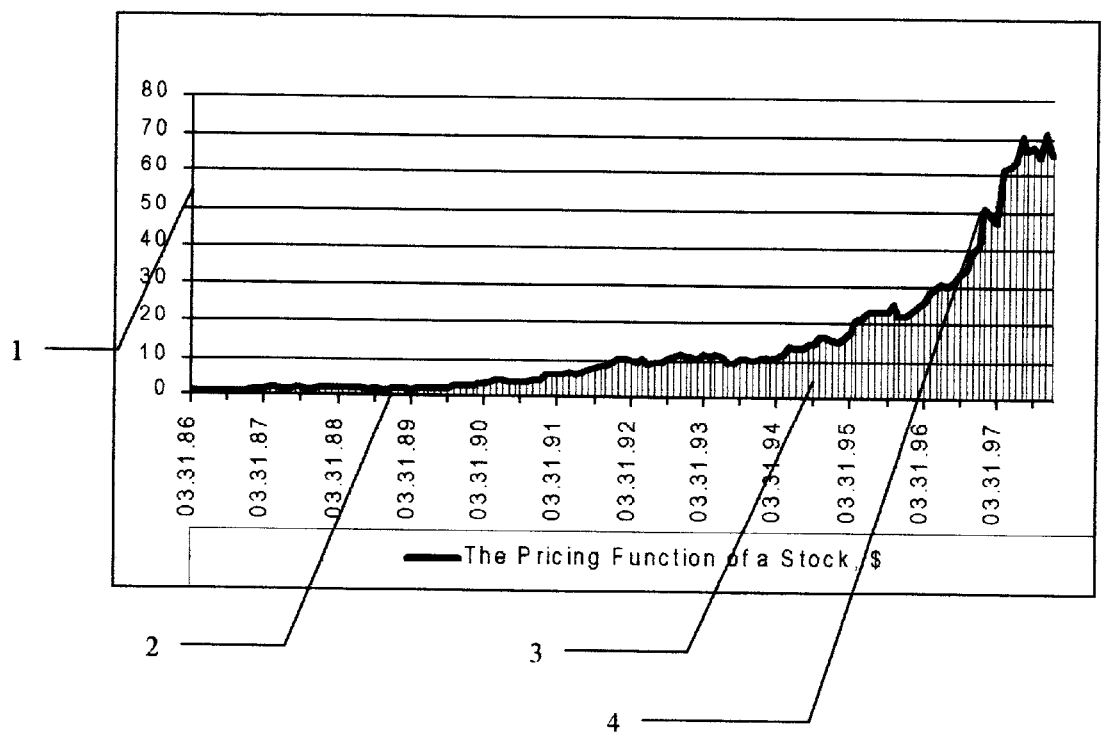
FIG. 1 is the pricing function of a stock, by example of the pricing data of MSFT-stock (Microsoft Corporation), in accordance with the present invention.

Referring now to the figures, FIG. 1 shows representation of the pricing data of a stock as a function of time, herein referred to as the pricing function of a stock. In a Cartesian coordinate system, with the ordinate axes1and the abscissa axes 2, the pricing data of a stock are plotted as ordinates 3. When all the ordinates 3 are plotted, this results in the pricing function of a stock 4, by example of the pricing data of MSFT-stock (Microsoft Corporation), in the period of Mar. 31, 1986–Dec. 31, 1997.

Figure 2:
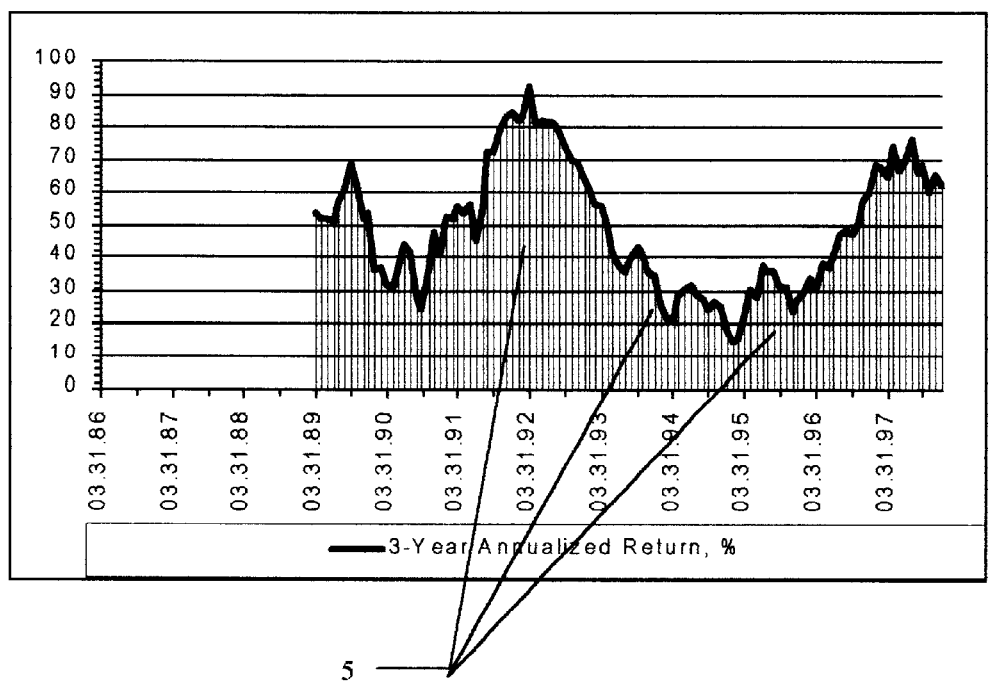
FIG. 2 is the representation of a set of possible returns on investment in a stock, by example of possible returns on an investment in MSFT-stock, in the Mar. 31, 1986–Dec. 31, 1997 period of time, in accordance with the present invention.

FIG. 2 shows a set of possible returns on investments in a stock 5 represented by the pricing function of a stock 4. In the preferred embodiment of the invention, each element of the set of possible return 5 is calculated by comparing the prices in the end and in the beginning of a predetermined investment term, in accordance with the following formula:

$$R_{nT\Delta t} = \frac{P_t - P_{t-T}}{P_{t-T}}, \quad (3)$$

where $R_{nT\Delta t}$ is an $n^{th}$ element of the set of possible returns on an investment, wherein each investment terms is equal T, inside a predetermined period of time;

$\Delta t$ is a time-step between the investment terms;

$P_t$ is an ordinate of the pricing function of a stock at a moment t, at the end of an investment term;

$P_{t-T}$ is an ordinate of the pricing function of a stock at a moment t-T, at the beginning of an investment term.

With the example of pricing data of MSFT-stock shown in FIG. 2, an investment term is chosen a 3-year time interval, and the time-step between the investment terms is chosen a month. Thus, the first element of the set of possible returns 5 is calculated for the investment term beginning on Mar. 31, 1986 and ending on Mar. 31, 1989; the second element of the set of possible returns 5 is calculated for the investment term beginning on Apr. 30, 1986 and ending on Apr. 30, 1989; the third element of the set of possible returns 5 is calculated for the investment term beginning on May 31, 1986 and ending on May 31, 1989, and so on. Over the period of Mar. 31, 1986–Dec. 31, 1997, there are 106 investment terms, such that each is equal a 3-year time interval. Thus, the set of possible returns 5 on investment in MSFT-stock contains 106 elements, separated by a month-step between them. This set of possible returns 5 is characterized by the maximum cumulative return on a 3-year investment of 613%, the median cumulative return of 225.5%, and the minimum cumulative return of 48% (respective annual compounded returns are 92%, 48%, and 14%). The median possible cumulative return of 225.5% is taken as an indicative return on a 3-year investment in MSFT-stock for the Mar. 31, 1986–Dec. 31, 1997 period of time.

In terms of DI-calculus, the above-described procedure is referred to as a DI-derivative of the pricing function of a stock under the 1/36/141 condition, meaning there is a 141-month lookback period in which 36-month investment terms are 1-month apart.

As a matter of fact, this DI-derivative fully represents all the possible returns on the investments in the MSFT-stock that 106 hypothetical investors would receive if they invested in the end of each month and redeemed their investments exactly 36-month later, over the Mar. 31, 1986–Dec. 31, 1997 period of time. That is why, in the theory of pragmatic investment, this DI-derivative referred to as the 3-year return function of a stock. This term will be used later in this description.

Figure 3:
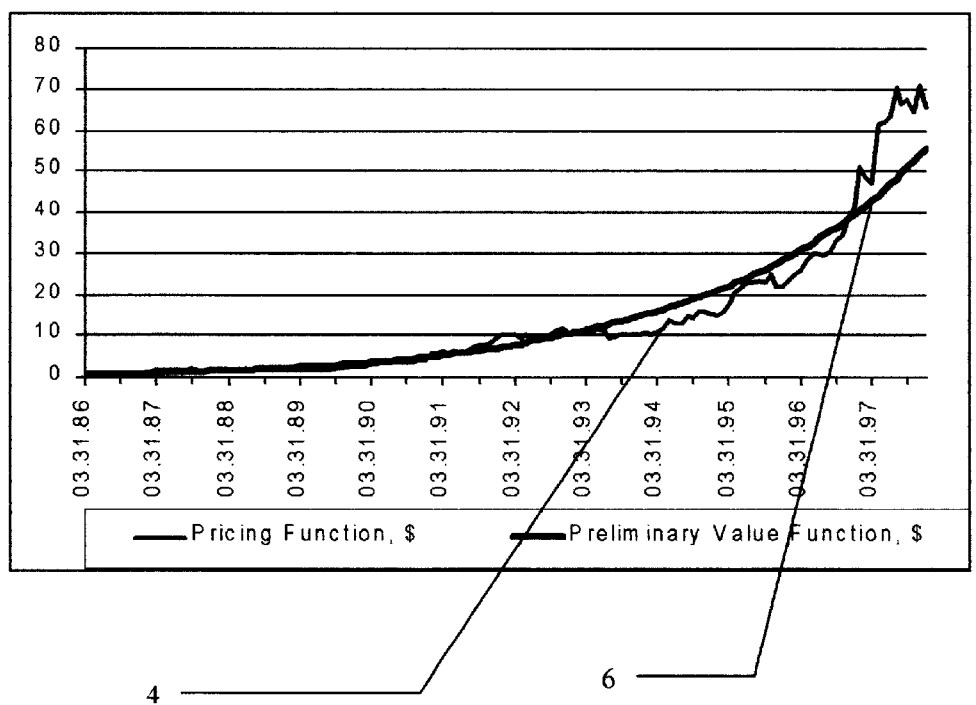
FIG. 3 is the preliminary value function of a stock, by example of the pricing data of MSFT-stock, in accordance with the present invention.

FIG. 3 shows an intermediate result of approximation of the pricing function of a stock 4 by a preliminary value function of the stock 6, by example of the pricing function of MSFT-stock. The approximation is made under the condition that the preliminary value function is a function of time of a non-negative derivative feature, meaning that all its differential coefficients are positive or zero at any given time-point inside the predetermined period of time, that is, in the Mar. 31, 1998–Dec. 31, 1997 period.

Similar to the set of possible returns on investment in the pricing function of a stock, a new set of possible returns on investment in a stock having a pricing function coinciding with the preliminary value function is calculated for the same 3-year investment terms separated by a month-step between them. Thus, the first element of the new set of possible returns is calculated for the investment term beginning on Mar. 31, 1986 and ending on Mar. 31, 1989; the second element of the new set of possible returns is calculated for the investment term beginning on Apr. 30, 1986 and ending on Apr. 30, 1989; the third element of the new set of possible returns is calculated for the investment term beginning on May 31, 1986 and ending on May 31, 1989, and so on.

In terms of the DI-calculus, the above-described procedure is termed the DI-derivative of the preliminary value function under the 1/36/141 condition (or, shorter, a 1/36/141 DI-Derivative). The basic requirement for a preliminary value function is that the difference between the median value of its DI-derivative and that of the related DI-derivative of the pricing function does not exceed a small predetermined limit, herein referred to as the error of return equilibrium. This requirement is usually met by adjustments of the preliminary value function in the course of an iterative procedure.

In the preferred embodiment of the invention, the approximation (smoothening) of the pricing function of a stock is exemplified by an iterative procedure at every step of which the error of return equilibrium is computed.

With the example of MSFT-stock pricing data, the acceptable error of return equilibrium was chosen to be equal 0.5%. Thus, the iterative procedure was stopped when the median value of the DI-derivative of the preliminary value function became equal 224.8%, while the median value of the DI-derivative of the pricing function equaled 224.5%, with the difference between the median values becoming equal 0.3%, which is less than the predetermined error of return equilibrium of 0.5%. The resulting preliminary value function of a stock 6 is shown in FIG. 3

In the preferred embodiment of the present invention, the ordinates of the preliminary value function of a stock are calculated in accordance with the following equation and conditions:

$$V_t = S_p V_{t-1} (P_t/P_0)^{1/t}$$

$$V_0 = P_0,$$

$$\text{If } P_t <= P_0 \text{ Then } V_t = V_{t-1}, \qquad (4),$$

where $V_t$ is an ordinate of the preliminary value function of a stock at a time-point t inside a predetermined period of time;

$V_{t-1}$ is an ordinate of the preliminary value function of a stock at a preceding, t−1, time-point inside the predetermined period of time;

$P_t$ is an ordinate of the pricing function of a stock at a time-point t inside the predetermined period of time;

$V_0$ is the beginning ordinate of the preliminary value function of a stock;

$P_0$ is the beginning ordinate of the pricing function of a stock;

$S_P$ is a scaling coefficient depending on specifics of the pricing function of a stock and being changed during the above-mentioned iterative procedure.

Figure 4:
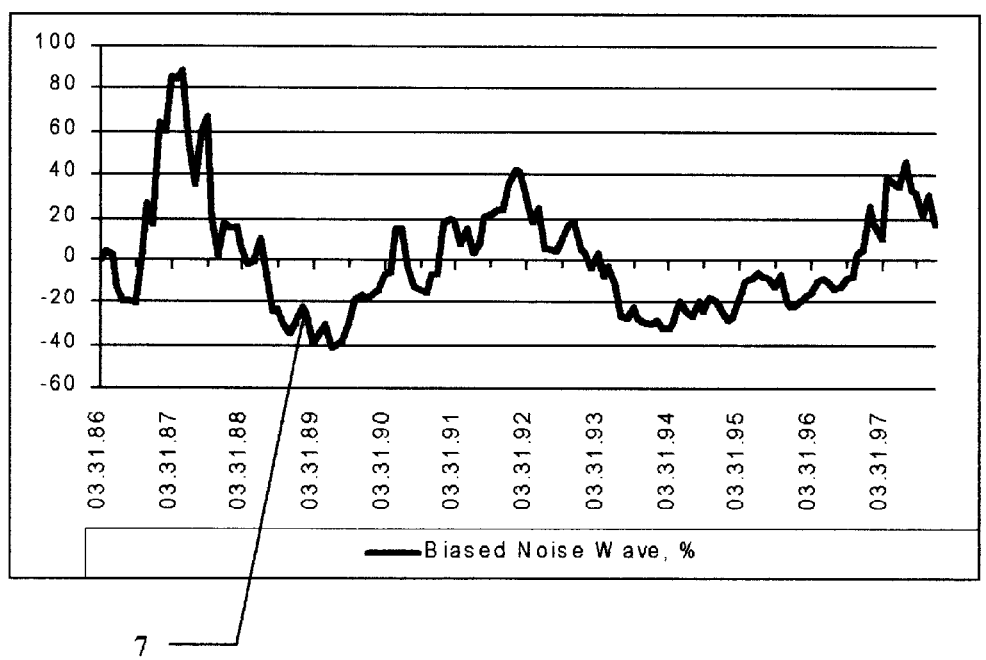
FIG. 4 is the biased noise wave of a stock, by example of the pricing data of MSFT-stock, in accordance with the present invention.

Next, with reference to FIGS. 3, 4, a biased noise wave 7 is produced by subtracting the ordinates of the preliminary value function 6 from the related ordinates of the pricing function 4 and then dividing the differences by the related ordinates of the preliminary value function of a stock 6.

Thus, the ordinates of the noise wave represent the noise level as a fraction or as a percent of the related real stock values. In other words, the noise wave of a stock represents the so-called relative noise level of a stock.

FIG. 4 shows a biased noise wave 7. The measure of the bias of a biased noise wave is the average from all of the ordinates, positive and negative, of this noise wave 7. In the example of FIG. 4 produced by using the pricing data of MSFT-stock in the period of Mar. 31, 1986–Dec. 31, 1997, the bias was 61%, or 0.61 if the ordinates of the biased noise wave were expressed in fractions. If this value exceeds a predetermined small limit of the bias, an additional adjustment of the preliminary value function of a stock 6 is required.

In the preferred embodiment of the present invention, an acceptable bias, which is also indicative of the error of the recovery of the real value of a stock from the stock pricing data, is required to be less than one millionth of a percent. To meet such a requirement, an adjustment of the preliminary value function of a stock 6 is made by multiplying the ordinates of the preliminary value function of a stock 6 by a function of the related biased noise wave 7. In the preferred embodiment of the invention, this function is chosen to be 1 plus the average value from all the ordinates of the biased noise wave 7.

Figure 5:
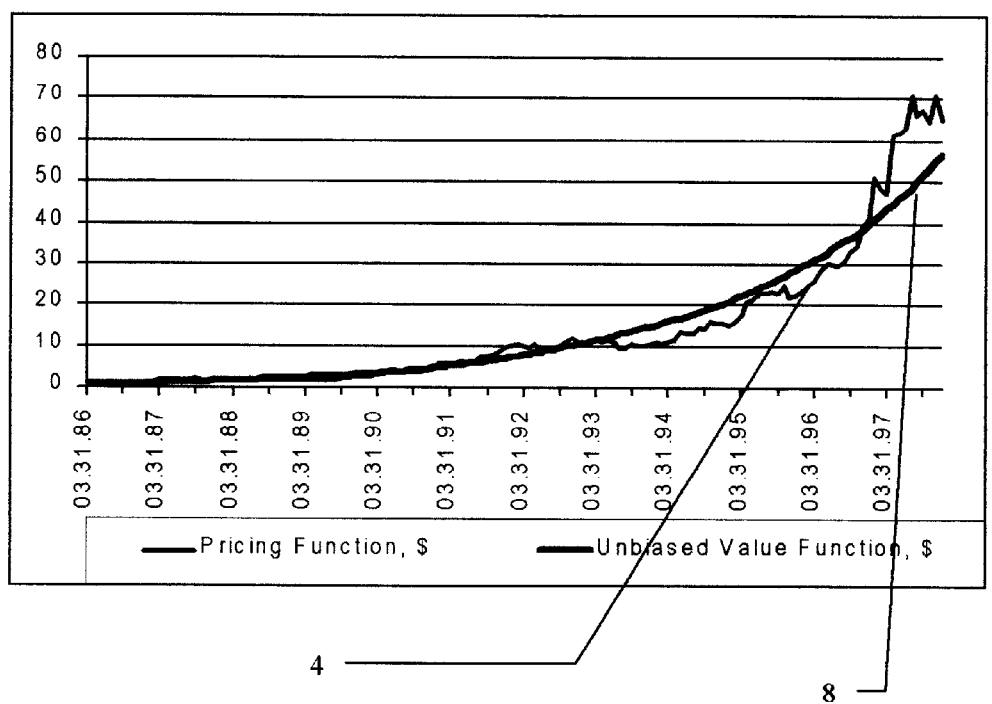
FIG. 5 is the value function of a stock, by example of the value function of MSFT-stock, in accordance with the present invention.
Figure 6:
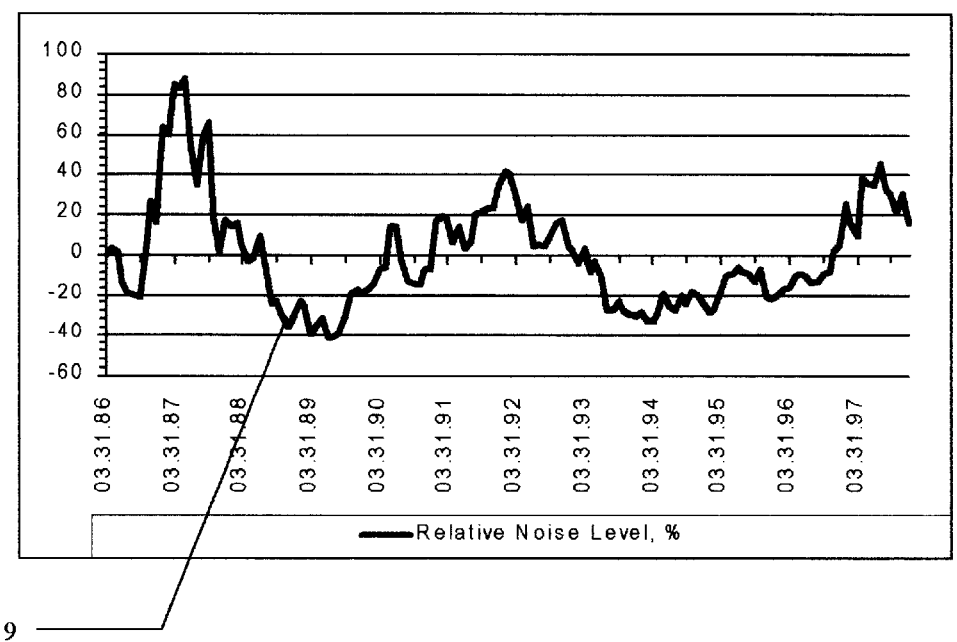
FIG. 6 is the noise wave of a stock, by example of the noise associated with MSFT-stock, in accordance with the present invention.

FIG. 5 shows the value function of a stock 8, which is the result of the adjustment of the preliminary value function of a stock 6. To arrive at the value function of MSFT-stock, the ordinates of the preliminary value function of the stock 6 have been multiplied by 1.0428, which is the average from all the ordinates of the biased noise wave 7 plus 1. This adjustment has reduced the bias of the resulting noise wave 9 shown in FIG. 6 to a very small number of $5.08 \times 10^{-13}$ percent points.

Thus, the additional adjustment of the preliminary value function of a stock has produced the value function of a stock 8. That ends the recovery of the value function of a stock from pricing data of a stock as, with the MSFT-stock pricing data, the error of $5.08 \times 10^{-13}\%$ is less than the acceptable error of the recovery of the value function of MSFT-stock from the stock pricing data. The fact that the bias of the noise wave is practically equals zero means that the noise wave recovered from pricing data of a stock is the true noise wave of the stock. In terms of DI-calculus, the above-described iterative procedure of arriving at the value function of a stock is called the quantitative integration of the DI-differential equation in the form of expression (4).

The value function of a stock 8 still should be considered a mathematical abstract produced by the formal procedures of DI-calculus. Now, we are going to prove that the value function of a stock recovered in accordance with the present invention represents the real value of a stock because it is firmly linked to financial fundamentals of an underlying enterprise.

In fact, FIGS. 1–5 provide an illustration on how to remove noise from some data containing the noise or distorted by the noise. By removing the noise from empirical data it is possible to arrive at underlying noise-free information contained in the data.

For example, corporations report their earnings quarterly. These earnings data inevitably contain a random component associated with random components in the revenues collected by quarter ends as well as in the related expenses incurred by the same date. Removing the noise is the way to arrive at noise-free earnings of a corporation. Similar to the value function of a stock, the noise-free earning may be represented by the value function of earnings recovered from earnings data. As these value functions are usually differently scaled, to compare them, their growth rates are appropriate to consider and compare.

Figure 7:
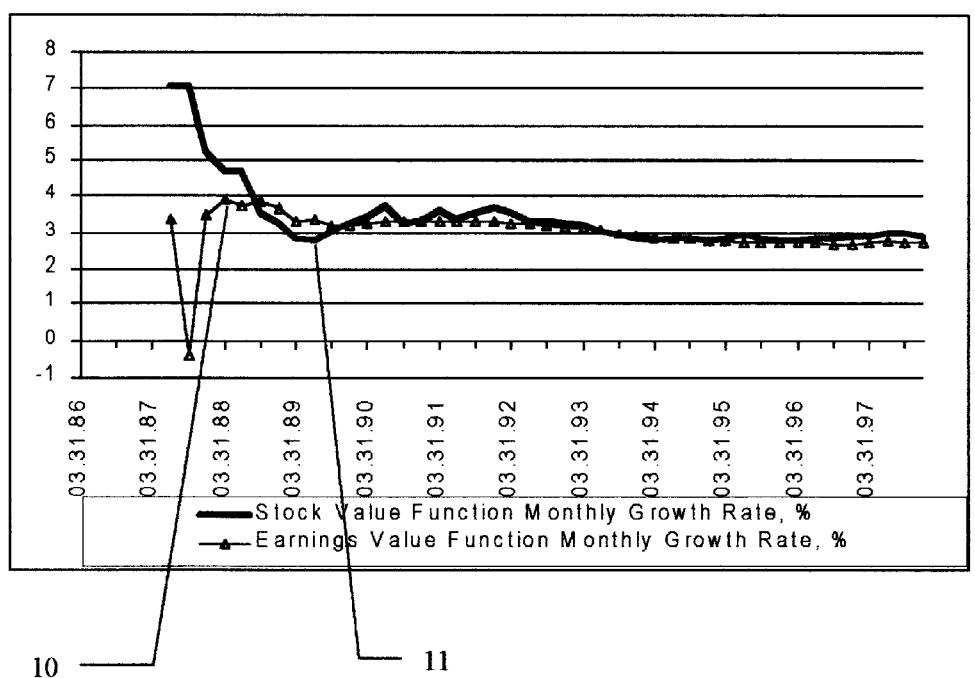
FIG. 7 is the growth rate of the value function of a stock vs. the growth rate of the noise-free earnings of a related corporation, by example of MSFT-stock and Microsoft Corporation, in accordance with the present invention.

FIG. 7 shows the monthly growth rate of the noise-free earnings 10, and the monthly growth rate of the related value function of a stock 11. The curve 10 was produced by removing the noise from the earnings data of Microsoft Corporation and then by differentiating the resulting noise-free function. The curve 11 was produced by differentiating the value function of MSFT-stock 8. Both the functions 10 and 11 were produced in accordance with the present invention for the Mar. 31, 1986–Dec. 31, 1997 period of time. It is evident that the curves 10 and 11 are definitely firmly linked, as they are running so closely that sometime it is difficult to distinguish between them.

In other cases, those curves of growth rates may run less closely.

Figure 8:
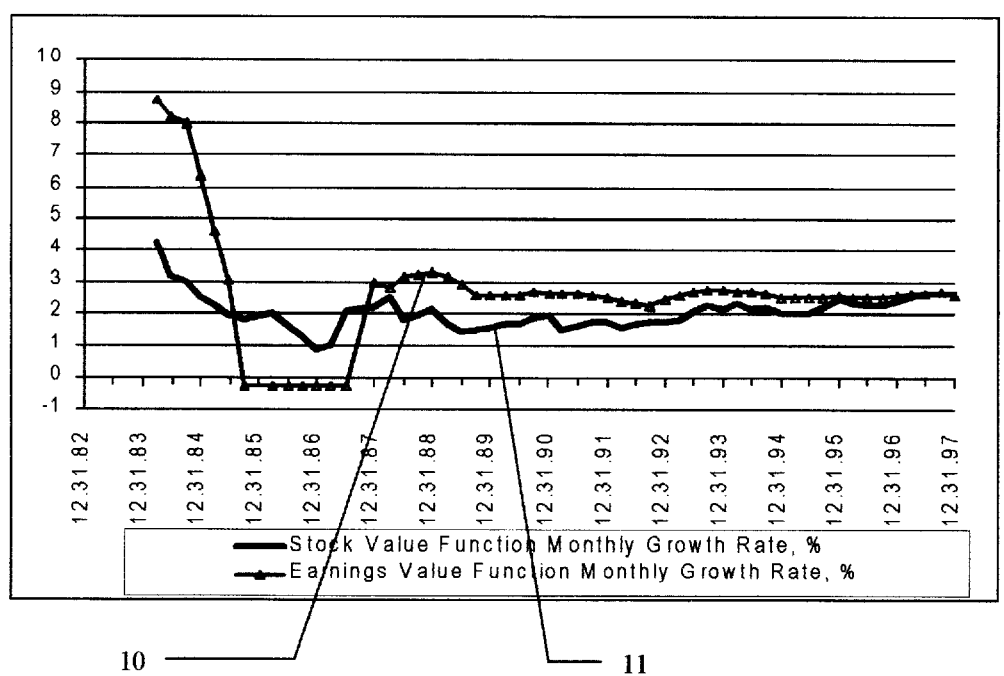
FIG. 8 is the growth rate of the value function of a stock vs. the growth rate of the noise-free earnings of a related corporation, by example of INTC-stock and Intel Corporation, in accordance with the present invention.

FIG. 8 shows the growth rate of noise-free earnings 10 and the growth rate of the value function of a stock 11 produced from the earnings data of Intel Corporation and from the pricing data of INTC-stock respectively, in accordance with the present invention. Though in this case the curves 10 and 11 are sometimes more distant than in the case of FIG. 7, there is no doubt that they are firmly linked as well.

The fact that the value function of a stock is firmly linked with the earnings of an underlying enterprise justifies considering the value function of a stock as an adequate representation of the real value of a stock recovered from the stock pricing data in accordance with the present invention.

Figure 9:
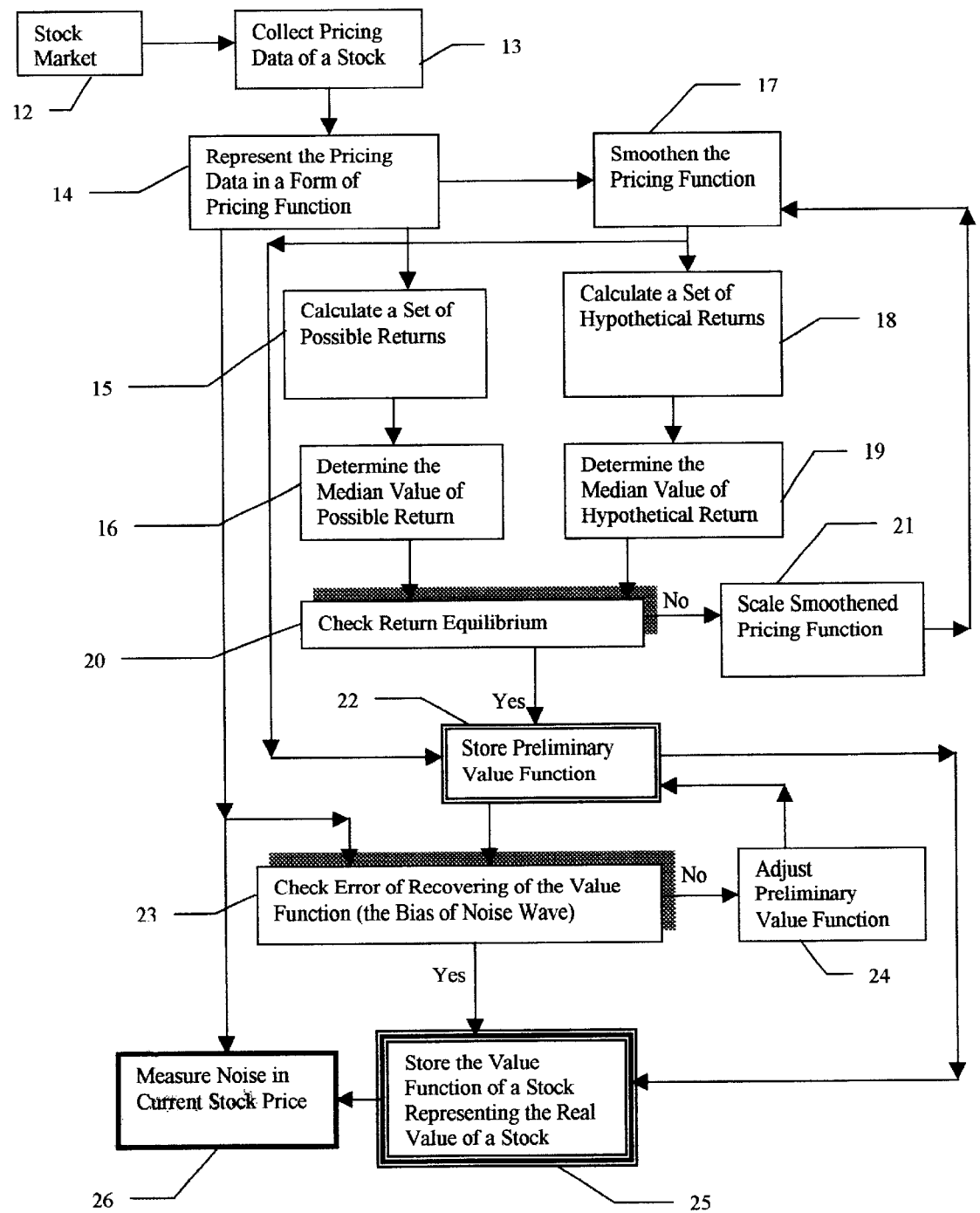
FIG. 9 is a block diagram that outlines the main steps of the present invention.

Turning now to FIG. 9, there is shown a block diagram outlining the main steps of the present invention. The first step 13 involves collecting pricing data of a stock in a stock market 12. The second step 14 involves representing the pricing data of a stock as a function of time, called the pricing function of a stock 4. The third step 15 deals with calculating a set of possible returns 5 on investment in a stock. Step four 16 involves determining the median value of the set of possible returns 5 on investment in a stock. Step five 17 involves transforming the pricing function of a stock 4 into a smoothened (approximated) pricing function of a stock under the condition that the smoothened function has a non-negative derivative feature (all positive or zero differential coefficients). Step six 18 deals with calculating a new set of possible returns on an investment in a stock whose pricing function would coincide with the smoothened pricing function of a stock. Step seven 19 involves determining the median value of the new set of possible returns on investment in a stock. In step eight 20, the condition of return equilibrium is checked. If the equilibrium of returns has not yet been reached, step nine 21 follows, involving the scaling of the smoothened pricing function of a stock, and repeating the steps 18, 19 20. When and if the step 20 confirms that the equilibrium of returns is reached, step ten 22 follows, involving the storing of the preliminary value function of a stock 6. Step eleven 23 deals with determining the noise wave of a stock and checking the bias of the noise wave 7. If the bias exceeds a predetermined value, step twelve 24 follows, involving an adjustment of the preliminary value function of the stock 6. When the bias becomes less than a predetermined small value, the adjustment of the preliminary value function of a stock 6 is finished, and in the step thirteen 25 the value function of a stock 8 is stored. In step fourteen 26 the measurement of the noise contained in the current stock price is conducted by comparing the related ordinates of the pricing function of a stock 4 and the value function of the stock 8 in the end of the predetermined period of time.

That ends the description of the technique of recovering the real value of a stock from the stock pricing data collected in the stock market.

The following part of the invention disclosure outlines the new approach to investment decision-making and provides examples of concrete applications of the value function of a stock and the characteristics of its noise wave to selecting stocks in a stock market.

Referring to FIGS. 7–8, it is enough evident that to the question, "What moves the stock market?" this invention provides the following answer: For an individual stock, a stock market acts as an automatic follow-up control system whose follow-up target is the growth rate of noise-free earnings of an underlying company. Having once established such a fundamental feature of a stock market, at least two important conclusions must be made in relation to selecting stocks in the market.

First, as any other follow-up up control system, this one is sufficiently inertial or slow, meaning it reacts only on long-term features of the follow-up target, not a sudden fluctuation of the latter. Practically that means that such sudden moves of a stock price that often occur when a company's quarter earnings meet or does not meet somebody's expectations are just fluctuations having not much to do with the real value of a stock. The value function of a stock is a quite slow function of time reflecting the fact that the fundamentals of a company do not change overnight. That is why a good-today stock by the criterion of the growth rate of its value function is typically a good-tomorrow stock by the same criterion.

Second, there is no reason to sell one stock and buy another until it is sufficiently evident that the latter's value function is better by the criterion of its growth rate. That is true not just for an investment term horizon of a couple of years but for an "investment" of a couple of hours as well, because after selling a stock and remaining in the market one have to buy another one, and if the latter has a lower growth rate, why buying it? If such buy-sell gambling is aimed at "outperforming" the market noise, it is impossible, as the mentioned-above true noise of a stock being summed up with the true noise of another one, brings about the same kind of true noise, which is typically a random variable of so-called normal probabilities distribution. Gambling with such a noise is a zero-benefit game. The latter means, that a long-term appreciation of an investment in stocks of a stock market is not more (but not less as well) than would suggest a resulting value function of a combination of those stocks owned by an investor over a given period of time.

Thus, the growth rate of the value function of a stock is a good (but not the only, as it will be proved later) criterion of selecting stocks in a stock market. Among other things, it is important to note that the current ordinate of the value function of a stock, not its current stock price, adequately represents the real value of a current investment in the stock. To deal with the value function of a stock is a way to avoid both the unnecessary enthusiasm of "on-paper wealth", when the stock is overpriced relative to its value function, as well as the unjustified discouragement when it is underpriced relative to the value function.

Once upon a time, the famous J. P. Morgan was asked what a stock price would be doing next. He replied: "It will fluctuate". This invention specifies that it will fluctuate around the value function of a stock.

The following example explains what does it mean practically.

A monthly update of the value function of ORCL-stock (Oracle Corporation) had been made on Feb. 26, 1999, for a standard 1/36/120 set of parameters, meaning a 120-month lookback period, 36-month investment term, and 1-month step between investment terms.

The value function of the stock had the following characteristics:

a) median growth rate: 45% per year;
b) current growth rate: 47.5% per year;
c) current stock value: $32.94.

The noise wave of this stock had the following basic characteristics:

a) current noise level: 13.1%;
b) maximum noise level registered in the lookback period: 59%;
c) minimum noise level registered in the lookback period: −80%.

Important features:

a) the median growth rate of the value function exceeds that of the market represented by the S & P's 500 Index by almost 4 times;

b) the value function of the stock is characterized by so-called acceleration, meaning that the current growth rate of 47.5% exceeds the median one of 45%;

c) the current noise level is a far cry from its extremes.

Conclusion:

a) ORCL is a good middle- or long term investment by the criterion of the growth rate of the stock's value;

b) There is too intensive the negative part of the noise wave, that is, −80% (a typical value is around −50%), which suggests that the stock price is prone to sudden downturns and related losses on a short-term investment.

On Mar. 12, 1999 the stock market confirmed that, as stock price dropped from $36.875 to $28.5625, that is, by 22.5% in just one trading session. Does that mean that value of your investment decreased by 22.5% as well or that the stock became a bad middle- or long-term investment? The next monthly update, on Mar. 31, 1999 had the following readings for the value function:

a) median growth rate: 45%;

b) current growth rate: 41.82%;

c) current stock value: $33.62.

The noise wave of this stock had the following basic characteristics:

d) current noise level: −21.54%;

e) maximum noise level registered in the lookback period: 61.8%;

f) minimum noise level registered in the lookback period: −80.3%.

Important features:

a) in spite of the sharp downturn of the stock price, the value of this investment has increased from $32.94 to $33.62, that is, by 2.06%;

b) the main characteristic of the trend of appreciation, that is, the median growth rate of the value function, remained unchanged and equal 45%;

c) the level of noise of −21.54% is still far from the extreme of −80.3%, that is, well inside the range of the observed noise patterns in the lookback period.

Conclusion: the investment value of this stock has not changed, notwithstanding the sharp downturn of its market price.

Three months later, the market again has confirmed this conclusion, as on Jun. 16, 1999, ORCL stock price has increased from $25.125 to $32.9375, that is, by 31% in just one trading session. Though it looks much more encouraging than the previous drop of the stock price, fundamentally, the value of this stock is still practically unchanged, by the criterion of its value appreciation, that is, the median growth rate of its value function.

While staying invested in a stock one can track the value of an investment solely by the value function of a stock, when divesting and calculating return on the investment, there is an evident necessity to correct the return suggested by the value function by a factor taking into account the difference of phases of the noise wave in the beginning and in the end of the investment period.

More specifically, referring to the last part of the example with ORCL-stock, if by any reason one has to redeem the investment on Mar. 31, 1999, soon after the sharp downturn of the stock price and after being invested over the lookback period of 120-month or 10 years, the following simple calculations would apply.

The real value of the stock in the beginning of the period has been $0.74; in the end it became equal $33.62. The value function of the investment has changed by 33.62/0.74=45.43 times. In the beginning of the period, noise level, $n_b$, was $n_b$=61.85%, at the end of the period the noise level, $n_e$, became equal $n_e$=−21.54%.

The noise correction factor, called InOut factor, is equal:

InOut=$(1+n_b)/(1+n_e)$=(1+0.6185)/(1−0.2154)=0.48.

The actual change of the investment is 45.43×0.48=21,85 times, which can be represented also as $(21.85^{1/10}-1) \times 100$= 36.1%, in the more convenient form of the compounded annual return on the investment.

Such an annual return over the 10-year period is definitely not a disappointment by itself. It shows that the selection of a stock on the basis of the growth rate of its value function brings about good long-term results.

But the both exemplified earlier value functions of ORCL-stock indicated the median growth rate of the investment being around a 45% per year. Why such a sensible difference with the final result of 36.1%?

The cause of the difference is the extremely unfavorable difference between the phases of the noise wave when entering the investment, that is, +61.85%, meaning the stock was overpriced, relative to its value function, by 61.85% when you bought it, while the output phase of the noise was −21.54%, meaning the stock was underpriced relative to the value function by 21.54% when you sold it. Typically, an individual investor can afford to stay invested for some additional time interval when a stock price would come back to its value function (for a good value function of a high rate of appreciation, the probability of such an event is very high), making the InOut factor more favorable for a final investment result. In our example, that would have taken just three additional months, as a monthly update of the value function on Jun. 30, 1999 has indicated that the stock price has practically returned to its real value (current noise level equals +3.06%), which made the InOut factor equal 0.77, evidently better than the 0.48 value of that for the three-month-ago time point).

Among other things of practically dealing with the value function of a stock, this simple example shows the advantage of an individual investor to time an investment and divestment with a stock in order to bring the InOut factor closer to 1, which would mean that the increase in an investment value nears the appreciation suggested by the growth rate of its value function. Contrary to that, if you are in a mutual fund, the fund manager is scrambling to constantly outperform some artificial benchmark, say, the S & P's 500 Index. Just a couple of percent points of the noise wave of a fund's portfolio is often sufficient to produce a 5-star outperform report of the fund on some definite date. But for an investor who is able to recover the real value of the Index and thus to discern that the growth rate of this index, as well as that of most mutual fund portfolios, is around 12% per year, a good question is this one: "What good it makes if your mutual fund even outperforms the Index when there are plenty of stocks in the market that would reward you by at least double growth rate if you would select an investment personally on the basis of the growth rate of the value function of a stock?"

While an answer to such a question is quite evident, still not as evident to investors that any investment performance indicator based solely on current stock price or on current portfolio index (net asset value) of a mutual fund is not informative enough or even misrepresentative until the growth rate of an investment and its current noise level are specified.

While dealing with the ORCL-stock example, the InOut factor was introduced. There is a very important generalization for this kind of ratio. Specifically, the noise wave of a stock can be characterized by a similar ratio representing the intensity of the noise associated with a stock, In:

$$In=(1+n_{max})/(1+n_{min}),$$

where $n_{max}$ is the maximum ordinate of the noise wave of a stock registered in a lookback period of time;

$n_{min}$ is the minimum ordinate of the noise wave of a stock registered in a lookback period of time.

The intensity of noise is indicative of how much the actual returns can differ relative to that suggested by a value function, which is crucially important for a short- or even a middle-term investment term.

The following example aims to prove that In is a good measure of the risk associated with an investment in a stock.

Referring again to the example with ORCL-stock, the update of the value function made on Mar. 31, 1999 shows that the intensity of the noise equals (1+0.618)/(1−0.803)= 8.23. That is quite high noise intensity. Practically, that means that the sudden sharp ups and downs of the stock price are possible quite often. This results in that even a 3-year investment term brings about a loss on an investment in ORCL. For example, a 3-year investment term ended on Sep. 30, 1992 has resulted in annual loss of −5.4%. Even worse were the losses on a 2-year investment term: a 2-year investment term ended on May 31, 1991 revealed annual compound loss of −29.87%; on Jun. 30, 1992, that was of −18.79%; on Aug. 31, 1998, that was of −7.98%, and quite a lot more losses on a short and middle term investments in the ORCL-stock in the lookback period.

Comparison with the value function of MSFT-stock (Microsoft Corporation) recovered under exactly the same conditions brings about the following result: median growth rate of the value function equals 50% per year; intensity of the noise wave equals 2.95.

Though the rates of appreciation of the both stocks are quite close and comfortably high, which is, 45% and 50% per year respectively, the noise intensity differs dramatically, that is, almost by three times. The DI-derivatives of MSFT pricing function under conditions of 1/36/120 and 1/24/120, that is, the 3- and 2-year return functions, indicate that there were no losses on 3-year and 2-year terms of investment, over the standard 120-month lookback period ending on Mar. 31, 1999.

The difference between ORCL and MSFT stocks can be captured by a simple ratio termed investment reward, Ir:

$$Ir=Gm/In,$$

where

Gm is the median growth rate of a value function, in a predetermined lookback period of time;

In is the intensity of the noise wave in the same period of time.

In our example, $$Ir(ORCL)=5.2$$

$$Ir(MSFT)=17.1.$$

Such a big difference between the investment rewards of these stocks manifests the significantly different investment results with these stocks, which are proven in the above-considered examples of returns on 2-year and 3-year investments.

The investment reward indicator was tested on thousands of stocks. Almost unfailingly, it provides a very good representation of possible disappointments in returns on a short- or middle-term investment that was based on a good value function but "spoiled" by intensive noise associated with a stock.

Based on the investment reward indicator, all the stocks, portfolios of stocks and market indices can be grouped in the following four, from A to D, categories:

A) Ir>30. Typically, individual stocks do not exhibit such a high value of investment reward. It is characteristic for a specially designed portfolio of stocks, so-called PI-Portfolio, which is an object of a separate invention;

B) 15<Ir<=30. It is characteristic for stocks whose 2-year return function is typically in positive territory, while a 3-year return function minimum exceeds a 10% of annual compounded return;

C) 5<Ir<=15. It is characteristic for stocks whose 2-year return function falls partly into negative territory, while a 3-year return function minimum can fall lower than the 5% level of the money market annual returns;

D) Ir<5. It is characteristic for stocks whose 2-year return functions indicate significant losses, while a 3-year return function is partly in the negative territory as well.

The following is an example of a D-investment-value stock.

Figure 10:
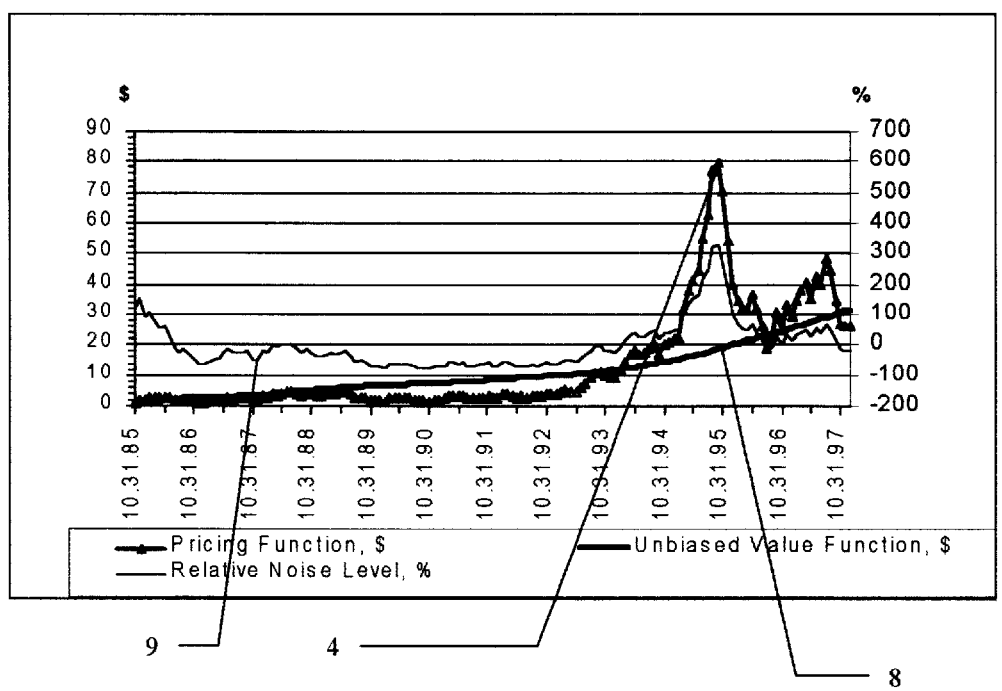
FIG. 10 is an example of a stock of extremely high intensity of noise associated with the stock, by an example of MU-stock (Micron Technology), in accordance with the present invention.

FIG. 10 shows the noise wave 9 of MU-stock (Micron Technology Corporation). When on Aug. 31, 1995, driven by unprecedented hype, MU-stock price 4 ran up from its real value 8 by more than 300% (just compare the related numbers: the closing price 4 was $77 while the real stock value 8 was just $19), a lot of people kept investing in the "noise bubble". The result: 10-month later, on Jun. 28, 1996, the stock price dropped to $26, close to its real value of $23. Had the warning provided by the present invention been ignored and an investment made at the peak of the noise bubble, the loss would have amounted to 67% of the investment. Even 2.5-year later, in late February 1998, the MU-stock price was around $35, i.e., the loss would still have been 55%.

In terms of the present invention, MU-stock can be exhaustively represented by the following characteristics:

a) median growth rate of the value function, Gm=26% per year, b) intensity of the noise wave, In=19.39 ($n_{max}$=326; $n_{min}$=−78%);

c) investment reward, Ir=1.36.

Though the median growth rate of the MU-stock value function surpasses that of such market indexes as Dow Jones Industrial Average, Standard & Poor's 500, and even NASDAQ Composite by almost two times, a short- or middle-term investor unlikely to benefit from that because of the terrible intensity of noise associated with this stock.

This example also shows that the investment reward indicator speaks volumes about a stock. This indicator perfectly represents the investment potential (investment value) of a stock. That is why the investment reward indicator can be taken as a basic integral characteristic for selecting stocks in a stock market.

The most important use of the investment reward indicator is in deciding about a sell-buy trading. Specifically, there is absolutely no reason to sell a stock and buy another one unless the latter represents greater investment value, in other words, unless the buy-stock has a greater investment reward indicator. Otherwise, there are three causes that would decrease ones investment benefits: 1) the direst disadvantage of replacing a good investment by not as good one; 2) trading (commission, fee, etc.) expenses; 3) the expenses related to the bid-ask spread incurred when finally buying back the sold stock.

The present invention provides a method for separating the pricing data of a stock into two components. The first one, namely, the value function of a stock is a slowly changing component representing the appreciation, if any, of a stock. Linked to noise-free earnings, the value function contains reliable information for determining return on a middle-or long-term investment. The second component, the noise associated with a stock in a stock market, specifies the possible dispersion of the actual return on an investment (including the possible loss on a middle- or long-term investment) around the "noiseless" return suggested by the value function of a stock.

In accordance with the present invention, the value function of a stock 8, plotted on the background of the pricing function of the stock 4, as in FIG. 5, provides a reliable way for determining on whether a stock is currently overpriced or underpriced relative to its real value. Based on the present invention, the question of how much noise in a current stock price can be answered in quantitative terms, which is of crucial importance for investment decision-making.

The present invention provides reliable quantitative characteristics of stock investment value (investment potential). Such characteristics of an investment as the growth rate of the value function of a stock, intensity of noise associated with a stock, and the investment reward are easy to get (a 300 MHz Pentium-based PC will provide the value function of a stock typically in less than a minute-long recovery procedure), easy to understand and effectively use by any investor, whatever his or her investment experience in capital markets.

In the preferred embodiment of the present invention, the method of recovering the real value of a stock from the stock pricing data is to be computer-implemented for allocating funds in a portfolio of securities.

A typically configured and software equipped personal computer (or a set of personal computers to speed up the process) contains all the necessary means for selecting a stock or a component for a portfolio of stocks in a stock market such that the investment reward of the stock is superior to that of another stock, a portfolio of stocks of a mutual fund, or a select market index, in accordance with the present invention.

For allocating funds in a portfolio of securities, in accordance with the preferred embodiment of the present invention, these means should include:

means (e.g., a modem) for receiving stock pricing data, mutual fund net asset value data, and select market indices from a provider of these data for a period of time being not less than a predetermined lookback period;

at least one processor (e.g., a chip allowing a "do while . . . loop" software procedure) for recovering the real value of each stock, of each mutual fund, and of each market index, and computing the noise wave of each stock, each mutual fund, and each market index in a select stock market and computing the investment reward of each stock, each mutual fund, and each market index in the stock market;

threshold means (e.g., an "if . . . then" software procedure, such as that available in Microsoft Office Visual Basic for Applications) for sifting out stocks, mutual funds, and stock market indices whose investment reward exceeds a predetermined threshold of investment value;

display means (e.g., a Microsoft Excel spreadsheet or a chart sheet) for visually or otherwise presenting the selected stocks, mutual funds and stock market indices in a form suitable for investment decision-making;

means (e.g., a modem) for on-line buying a selected stock (stocks) from an e-broker (e.g., Internet-based broker).

One more possibility of a computer implementation of the claimed method is a method for computerized stock selection for a portfolio of stocks aimed at containing components whose investment reward exceeds a predetermined investment value, comprising the steps of:

for each stock of a select stock market, electronically acquiring pricing data for a period of time being not less than a predetermined lookback period, electronically recovering the real value of each stock, computing the noise wave of each stock, and computing the investment reward of each stock;

electronically selecting stocks whose investment reward exceeds a predetermined investment value;

electronically selecting stocks whose current investment reward exceeds a predetermined investment value while these stocks are not included in the current portfolio, and presenting these stock in a form of a buy-recommendation;

electronically selecting stocks whose current investment reward is less than a predetermined investment value while these stocks are in the current portfolio, and presenting these stocks in a form of a sell-recommendation;

electronically selling and buying the selected stocks.

Unlike the overwhelming probabilistic approach to analyzing investments in a stock market, with its obscure or confusing, for an ordinary investor, notions and definitions like the standard deviation, volatility, BETA, ALPHA and many others, this invention provides for an ordinary investor a possibility to rely on easily, or even intuitively perceived notions such as growth rate of an investment and the intensity of noise as the measure of risk associated with the investment.

Such a result of the present invention is not incidental. Fundamentally, this invention is based on the concept of direct measurement in such a social system as a stock market in the same way as this concept is applied to natural or technical systems. Unlike the probabilistic approach leading to more and more complex means for processing tons of data, direct measurement proves able to produce new knowledge about a system, while data processing typically results in just a new form of representing the data, with still no sufficient evidence that such a new form can be interpreted as new knowledge.

As an example of new knowledge about a stock market, of a probably most important future consequence of this invention, is the evidence that a stock market has revealed features of a follow-up automatic control system. Being fundamental for natural and technical applications ranging from the Moon-Earth "system", to an auto-piloted plane, to a rider-bicycle system, and many other systems whose only way of existence is a dynamic equilibrium against a follow-up target, this feature implies a possibility to apply to a stock market the wealth of the knowledge accumulated for such systems, with far reaching consequences for investors.

Though seemingly unrelated to the scope of this invention, the last observation relates to adoption of this invention for practical use. The evidence that this invention can be related to a wide range of proven applications could result in a shorter period of adopting the investment decisions based on the real value of a stock recovered from the stock pricing data collected in a stock market.

While the preferred embodiment of the present invention has been described, it will be apparent to those skilled in this art that various modifications may be made in this embodiment without departing from the spirit of the present invention. Therefore, all suitable modifications and equivalents fall within the scope of the present invention that is defined in the following claims.

What is claimed is:

1. A computer-implemented method of recovering the real value of a stock from pricing data of the stock collected in a stock market for selecting an individual stock or a component for a portfolio of stocks from stocks participating in the stock market, comprising the steps of:

representing pricing data of the stock as a function of time, herein referred to as the pricing function of the stock, for a predetermined period of time;

approximating said pricing function of the stock by a continuous function of time of a non-negative derivative feature, herein referred to as the value function of the stock, such that investment performance of said value function of the stock differs from that of said pricing function of the stock by less than a small predetermined limit of investment performance;

computing the ordinates of a random function of time, herein referred to as the noise wave of the stock, by subtracting the ordinates of said value function of the stock from the related ordinates of said pricing function of the stock and dividing the differences by the related ordinates of said value function of the stock;

interpreting said value function of the stock as a trend of appreciation of an investment in the stock;

computing the growth rate of said value function of the stock and taking it as a quantitative measure of appreciation of an investment in the stock;

computing an indicator of noise intensity associated with the stock in the stock market as a function of ordinates of said noise wave of the stock and taking said indicator of noise intensity as a quantitative measure of risk of an investment in the stock;

computing an integral indicator of investment value of the stock, herein referred to as investment reward of the stock, as a function of said measure of appreciation of an investment in the stock and said measure of risk of an investment in the stock;

selecting the stock as an individual investment or a component for a portfolio of stocks based on said integral indicator of investment value of the stock such that the investment reward of the stock is superior to a predetermined threshold of investment value of another stock, or a portfolio of stocks, or a select market index;

purchasing the selected stock as an individual investment or as a component for a portfolio of stocks.

2. The method of claim 1 in which said investment performance of the stock is interpreted as the median return on an investment in the stock and the ordinates of said value function of the stock are computed in accordance with the following equation and conditions:

$$V_t = S_P V_{t-1} (P_t/P_0)^{1/t}$$

$$V_0 = P_0,$$

If $P_t <= P_0$ Then $V_t = V_{t-1}$, where $V_t$ is an ordinate of said value function of the stock related to a time-point t inside said predetermined period of time;

$V_{t-1}$ is an ordinate of said value function of the stock related to a preceding, t−1, time-point inside said predetermined period of time;

$P_t$ is an ordinate of said pricing function of the stock related to a time-point t inside said predetermined period of time;

$V_0$ is the beginning ordinate of said value function of the stock;

$P_0$ is the beginning ordinate of said pricing function of the stock;

$S_P$ is a scaling coefficient depending on specifics of said pricing function of the stock;

wherein the scaling coefficient is adjusted by an iterative procedure until the difference between the median return on an investment in the stock represented by said pricing function of the stock and the median return on an investment in a stock whose pricing function would coincide with said value function of the stock becomes less than a small predetermined limit.

3. The method of claim 2 in which said value function of the stock is adjusted by multiplying its ordinates by the factor that equals 1 plus the average value from all the ordinates of said noise wave of the stock over said predetermined period of time.

4. The method of claim 2 in which said median return on an investment in the stock is calculated by dividing said predetermined period of time into smaller time intervals, herein referred to as investment terms, such that said investment terms are equal and are separated by a predetermined time-step between the beginning of a previous one and the beginning of a next one of said investment terms, wherein a set of possible returns on investments in the stock is calculated by comparing the ordinates of said pricing function at the end and at the beginning of each investment term, wherein the median value of said set of possible returns is taken as median return on an investment of said investment term in the stock in said predetermined period of time.

5. The method of claim 1 in which said growth rate of said value function of the stock equals the median growth rate of said value function of the stock over said predetermined period of time.

6. The method of claim 1 in which said indicator of noise intensity associated with the stock in the stock market is calculated in accordance with the following formula:

$$In = (1 + n_{max})/(1 + n_{min}),$$

where

In is the indicator of the noise intensity;

$n_{max}$ is the maximum ordinate of said noise wave of the stock;

$n_{min}$ is the minimum ordinate of said noise wave of the stock.

7. The method of claim 1 in which said investment reward of the stock is calculated in accordance with the following formula:

$$Ir = Gm/In,$$

where

Ir is the investment reward of the stock;

Gm is the median growth rate of said value function of the stock;

In is the noise intensity associated with the stock.

* * * * *